United States Patent
Yu et al.

(10) Patent No.: US 12,531,564 B2
(45) Date of Patent: Jan. 20, 2026

(54) SYNCHRONIZING MULTIPLE PHASE-LOCKED LOOP CIRCUITS

(71) Applicant: QUALCOMM Incorporated, San Diego, CA (US)

(72) Inventors: Jianjun Yu, San Diego, CA (US); Tomas O'Sullivan, San Diego, CA (US); Razak Hossain, San Diego, CA (US); Lai Kan Leung, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 586 days.

(21) Appl. No.: 17/933,327

(22) Filed: Sep. 19, 2022

(65) Prior Publication Data

US 2024/0097689 A1    Mar. 21, 2024

(51) Int. Cl.
  *H03L 7/197* (2006.01)
  *H04L 7/033* (2006.01)

(52) U.S. Cl.
  CPC ............ *H03L 7/1976* (2013.01); *H04L 7/033* (2013.01)

(58) Field of Classification Search
  CPC .............................. H03L 7/1976; H04L 7/033
  See application file for complete search history.

(56) References Cited

U.S. PATENT DOCUMENTS

| | | | | |
|---|---|---|---|---|
| 9,048,847 B2* | 6/2015 | McLaurin | ............. | H03L 7/1976 |
| 9,979,408 B2* | 5/2018 | Mayer | .................. | H03L 7/087 |
| 10,243,573 B1* | 3/2019 | Goyal | .................. | H03L 7/1976 |
| 10,291,242 B1* | 5/2019 | Elbadry | .................. | H03L 7/099 |
| 10,542,312 B1* | 1/2020 | Bassett | .................... | H04L 7/042 |
| 10,855,225 B1* | 12/2020 | Taghivand | ............ | H04B 1/0057 |
| 11,165,431 B1* | 11/2021 | Kenney | .................. | H03L 7/0814 |
| 11,387,833 B1* | 7/2022 | Li | ............................ | H03L 7/081 |
| 2007/0046388 A1* | 3/2007 | Sanders | ................... | H03L 7/107 |
| | | | | 331/179 |
| 2008/0136531 A1* | 6/2008 | Kim | ....................... | H03L 7/093 |
| | | | | 331/2 |
| 2015/0084676 A1* | 3/2015 | McLaurin | ................. | H03L 7/23 |
| | | | | 327/142 |
| 2016/0359614 A1* | 12/2016 | Hao | ........................ | H04L 7/0087 |
| 2017/0324419 A1 | 11/2017 | Mayer et al. | | |
| 2021/0173070 A1 | 6/2021 | Cherniak et al. | | |
| 2022/0393565 A1* | 12/2022 | Li | ............................ | H03K 5/131 |
| 2023/0216654 A1* | 7/2023 | Perumana | .............. | H04B 17/21 |
| | | | | 375/262 |
| 2024/0097689 A1* | 3/2024 | Yu | ........................... | H03L 7/1976 |
| 2024/0106623 A1* | 3/2024 | Liu | .......................... | H04L 7/033 |

FOREIGN PATENT DOCUMENTS

EP    1610204 B1    10/2008

OTHER PUBLICATIONS

International Search Report and Written Opinion—PCT/US2023/073677—ISA/EPO—Dec. 15, 2023.

* cited by examiner

*Primary Examiner* — Adam D Houston
(74) *Attorney, Agent, or Firm* — Patterson + Sheridan, L.L.P.

(57) ABSTRACT

Aspects of the present disclosure provide techniques and apparatus for synchronizing phase-locked loop (PLL) circuits. An example method of operating PLL circuits includes obtaining an indication to perform a synchronizing action at a first PLL circuit and a second PLL circuit; and performing the synchronizing action at the first PLL circuit and the second PLL circuit in response to obtaining the indication.

28 Claims, 7 Drawing Sheets

SYNCHRONIZING MULTIPLE PHASE-LOCKED LOOP CIRCUITS

BACKGROUND

Field of the Disclosure

Certain aspects of the present disclosure generally relate to electronic circuits and, more particularly, to techniques and apparatus for synchronizing multiple phase-locked loop (PLL) circuits.

Description of Related Art

Electronic devices include traditional computing devices such as desktop computers, notebook computers, tablet computers, smartphones, wearable devices like a smartwatch, internet servers, and so forth. These various electronic devices provide information, entertainment, social interaction, security, safety, productivity, transportation, manufacturing, and other services to human users. These various electronic devices depend on wireless communications for many of their functions. Wireless communication systems and devices are widely deployed to provide various types of communication content such as voice, video, packet data, messaging, broadcast, and so on. Wireless communication devices may transmit and/or receive radio frequency (RF) signals via any of various suitable radio access technologies (RATs) including, but not limited to, 5G New Radio (NR), Long Term Evolution (LTE), Code Division Multiple Access (CDMA), Time Division Multiple Access (TDMA), Wideband CDMA (WCDMA), Global System for Mobility (GSM), Bluetooth, Bluetooth Low Energy (BLE), ZigBee, wireless local area network (WLAN) RATs (e.g., IEEE 802.11), and the like. Such devices may use frequency synthesizers to generate RF signals at various frequencies. In some cases, the frequency synthesizers may use phase-locked loops with digitally controlled oscillators and/or voltage controlled oscillators to generate local oscillator signals, for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include improved phase coherence between multiple oscillator signals and improved wireless communication performance via coherent transmissions.

Certain aspects of the present disclosure provide a method of operating phase-locked loop (PLL) circuits. The method generally includes obtaining an indication to perform a synchronizing action at a first PLL circuit and a second PLL circuit; and performing the synchronizing action at the first PLL circuit and the second PLL circuit in response to obtaining the indication.

Certain aspects of the present disclosure provide an apparatus. The apparatus generally includes a first PLL circuit and a second PLL circuit, wherein the first PLL circuit and the second PLL circuit are configured to: obtain an indication to perform a synchronizing action, and perform the synchronizing action in response to obtaining the indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
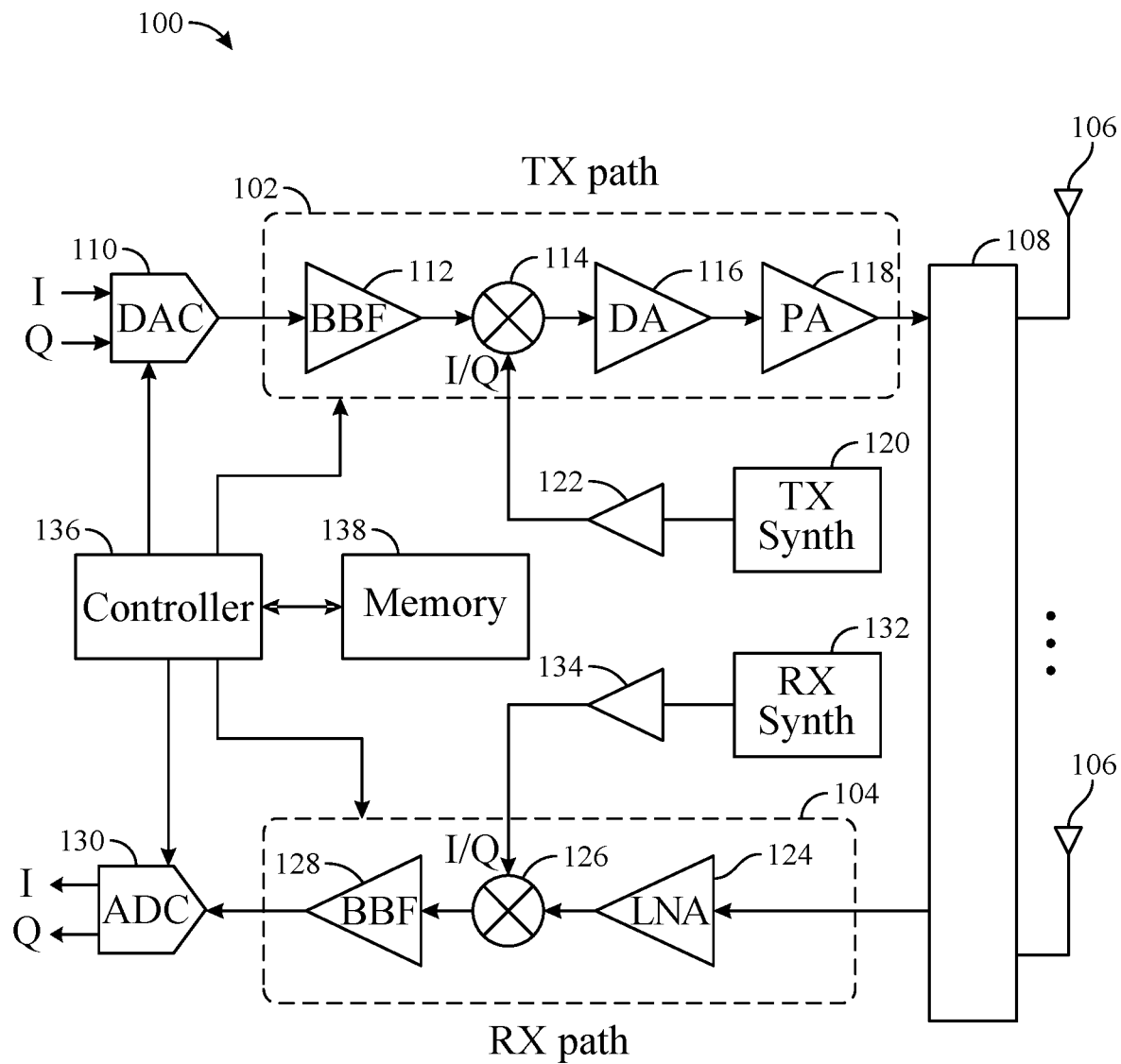
FIG. 1 is a block diagram of an example radio frequency transceiver.

Certain aspects of the present disclosure relate to methods and apparatus for synchronizing phase-locked loop circuits.

Certain wireless communication systems (such as Fifth Generation (5G) New Radio (NR) systems or future radio access technologies) may allow a user equipment (UE) to communicate via coherent uplink (UL) multiple-input and multiple-output (MIMO), where at least two physical antenna ports at the UE transmit coherent signals. As an example, 5G NR wireless standards provide certain criteria for a transmission to be considered coherent UL MIMO. In order to be considered coherent UL MIMO, the 5G NR wireless standards provide the maximum allowable difference between the measured relative power and phase errors between different physical antenna ports in any slot within a specified time window (e.g., 20 milliseconds (ms)) from the last transmitted sounding reference signal (SRS) on the same antenna ports. For example, the maximum allowable difference between the measured relative power may be 4 decibels (dB), and the maximum allowable phase error may be 40 degrees. That is, the difference between the relative power at two antenna ports may be at most 4 dB, and the phase error between two antenna ports may be at most 40 degrees in order to be considered coherent under the 5G NR wireless standards.

The allowable phase error can correspond to an allowable time delay between the antenna ports. Assuming, for example, a carrier frequency of 2.5 GHz, the maximum allowable phase error corresponds to a maximum allowable time delay of 44 picoseconds (ps) between the antenna ports. As coherent UL MIMO is defined in the 5G NR standards for Frequency Range 1 (FR1, including 410 MHz-7125 MHz) and Frequency Range 2 (FR2, including 24,250 MHz-71,000 MHz), the maximum allowable time delay may range from 1.5 ps to 270 ps depending on the carrier frequency (71,000 MHz or 410 MHz respectively). It will be appreciated that the criteria for coherent UL MIMO communications under the 5G NR wireless standards are merely an example. Other criteria may be used in addition to or instead of those described herein. For example, future radio access technologies may reduce the phase error and/or relative power for coherent UL MIMO communications.

Certain aspects of the present disclosure provide methods and apparatus for synchronizing phase-locked loop (PLL) circuits, for example, for coherent UL MIMO communications or for any of other various suitable applications. A wireless communications device (e.g., a user equipment) may include a transceiver (also referred to as a radio frequency front-end (RFFE) circuit or RF transceiver circuit) for transmitting and/or receiving RF signals. In certain cases, the transceiver may employ a frequency synthesizer to generate a carrier frequency for downconversion and/or upconversion mixer operations. The frequency synthesizer may use a PLL-based voltage-controlled oscillator (VCO) to generate the carrier frequency, for example, as further described herein with respect to FIGS. 1-3. The PLL circuits associated with different antenna ports may be synchronized to output periodic signals within the maximum allowable phase error (e.g., 40 degrees) for coherent UL MIMO communications.

For example, the PLL circuits may perform synchronized PLL initialization, where the PLL circuits are triggered to start outputting at the same time or within the allowable phase error. The PLL circuits may perform synchronized frequency hopping, where the PLL circuits are triggered to change frequencies according to a frequency hopping sequence at the same times or within the allowable phase error. The PLL circuits may perform synchronized frequency correction, where the PLL circuits are trigged to adjust the output frequency at the same time or within the allowable phase error. In certain cases, the reference clock dividers for the PLL circuits may be synchronized to start dividing at the same time or within the allowable phase error.

The methods and apparatus for operating PLL circuits described herein may provide various advantages. For example, the methods and apparatus described herein may allow for improved phase coherence between multiple oscillator signals or for a UE to perform coherent UL MIMO communications, which may provide improved wireless communication performance. Coherent UL MIMO may allow a UE to transmit a stronger signal to other wireless communication devices (e.g., a base station). For example, coherent UL MIMO may allow a UE to transmit at improved data rates and/or reduced latencies due to the improved signal quality at the receiver. Coherent UL MIMO may allow a UE to increase its communication distance, such as, communicating at the edge of a cell due to the stronger signal strength at the receiver. The methods and apparatus described herein may allow a UE to dynamically switch between coherent UL MIMO and non-coherent MIMO, for example, for UL carrier aggregation and/or single port communications.

Example RF Transceiver

FIG. 1 is a block diagram of an example RF transceiver circuit 100, in accordance with certain aspects of the present disclosure. The RF transceiver circuit 100 includes at least one transmit (TX) path 102 (also known as a "transmit chain") for transmitting signals via one or more antennas 106 and at least one receive (RX) path 104 (also known as a "receive chain") for receiving signals via the antennas 106. When the TX path 102 and the RX path 104 share an antenna 106, the paths may be connected with the antenna via an interface 108, which may include any of various suitable RF devices, such as a switch, a duplexer, a diplexer, a multiplexer, and the like.

Receiving in-phase (I) or quadrature (Q) baseband analog signals from a digital-to-analog converter (DAC) 110, the TX path 102 may include a baseband filter (BBF) 112, a mixer 114, a driver amplifier (DA) 116, and a power amplifier (PA) 118. The BBF 112, the mixer 114, the DA 116, and the PA 118 may be included in a radio frequency integrated circuit (RFIC). In certain aspects, the PA 118 (and/or other components) may be external to the RFIC. The BBF 112 filters the baseband signals received from the DAC 110, and the mixer 114 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the "beat frequencies." The beat frequencies are typically in the RF range (e.g., FR1 and/or FR2), such that the signals output by the mixer 114 are typically RF signals, which may be amplified by the DA 116 and/or by the PA 118 before transmission by the antenna 106.

The RX path 104 may include a low noise amplifier (LNA) 124, a mixer 126, and a baseband filter (BBF) 128. The LNA 124, the mixer 126, and the BBF 128 may be included in a RFIC, which may or may not be the same RFIC that includes the TX path components. RF signals received via the antenna 106 may be amplified by the LNA 124, and the mixer 126 mixes the amplified RF signals with a receive local oscillator (LO) signal to convert the RF signal of interest to a different baseband frequency (e.g., downconvert). The baseband signals output by the mixer 126 may be filtered by the BBF 128 before being converted by an analog-to-digital converter (ADC) 130 to digital I or Q signals for digital signal processing.

Certain transceivers may employ frequency synthesizers with a variable-frequency oscillator (e.g., a voltage-controlled oscillator (VCO) or a digitally controlled oscillator (DCO)) to generate a stable, tunable LO frequency with a particular tuning range. Thus, the transmit LO frequency may be produced by a TX frequency synthesizer 120, which may be buffered or amplified by amplifier 122 before being mixed with the baseband signals in the mixer 114. Similarly, the receive LO frequency may be produced by an RX frequency synthesizer 132, which may be buffered or amplified by amplifier 134 before being mixed with the RF signals in the mixer 126. For certain aspects, a single frequency synthesizer may be used for both the TX path 102 and the RX path 104. In certain cases, the TX frequency synthesizer 120 and/or the RX frequency synthesizer 132 may be implemented using PLL circuits as further described herein with respect to FIGS. 2 and 3.

A controller 136 may direct the operation of the RF transceiver circuit 100, such as adjusting gains applied to the TX path 102 and/or the RX path 104 and/or adjusting the carrier frequency output by the TX path 102. In certain aspects, the controller 136 may perform operations further described herein related to operating PLL circuits. The controller 136 may include a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 138 may store data and program codes for operating the RF transceiver circuit 100. The memory 138 may be configured to store instructions (e.g., computer-executable code or instructions) that when executed by the controller 136, cause the controller 136 to perform operations further described herein related to operating PLL circuits.

While FIG. 1 provides an RF transceiver as an example application in which certain aspects of the present disclosure may be implemented to facilitate understanding, certain aspects described herein related to operating PLL circuits may be utilized in various other suitable electronic systems.

Example of Synchronizing Multiple PLL Circuits

Figure 2:
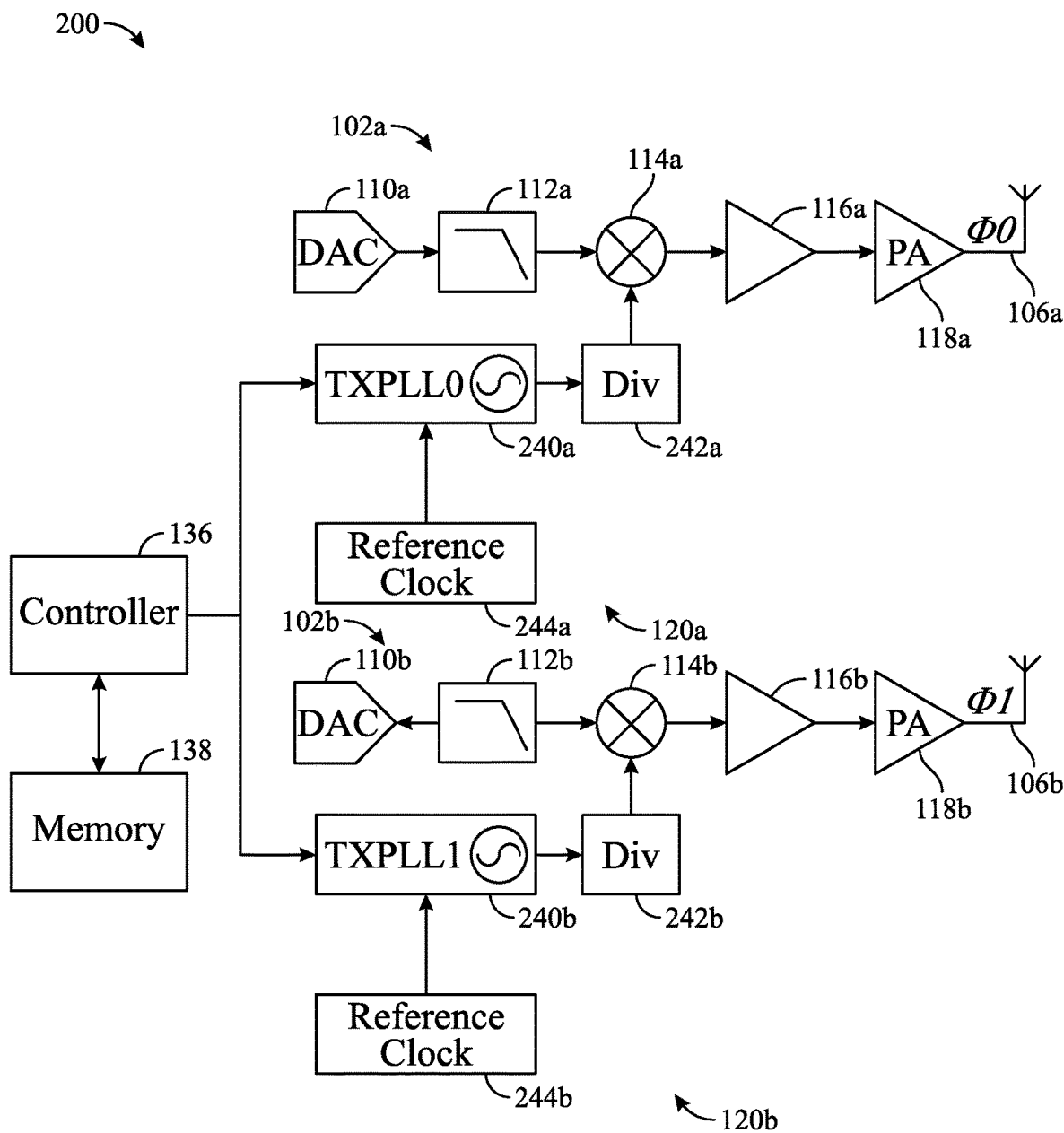
FIG. 2 is a block diagram illustrating further details of an example radio frequency transceiver configured to synchronize transmit frequency synthesizers.

FIG. 2 is a block diagram illustrating an RF transceiver circuit 200 having multiple transmit paths 102a, 102b with different TX frequency synthesizers 120a, 120b. In this example, a first transmit path 102a may be coupled to a first antenna 106a, and a second transmit path 102b may be coupled to a second antenna 106b. Each of the transmit paths 102a, 102b may use the same transceiver components as described herein with respect to FIG. 1. For example, each of the transmit paths 102a, 102b may have a corresponding TX frequency synthesizer 120a, 120b. The first TX frequency synthesizer 120a may include a PLL circuit 240a, a post-divider 242a, and a reference clock 244a. The first TX frequency synthesizer 120a may be representative of the second TX frequency synthesizer 120b. It will be appreciated that the PLL-based TX frequency synthesizers are merely examples, and other TX frequency synthesizers may be synchronized as described herein for coherent transmissions.

Figure 3:
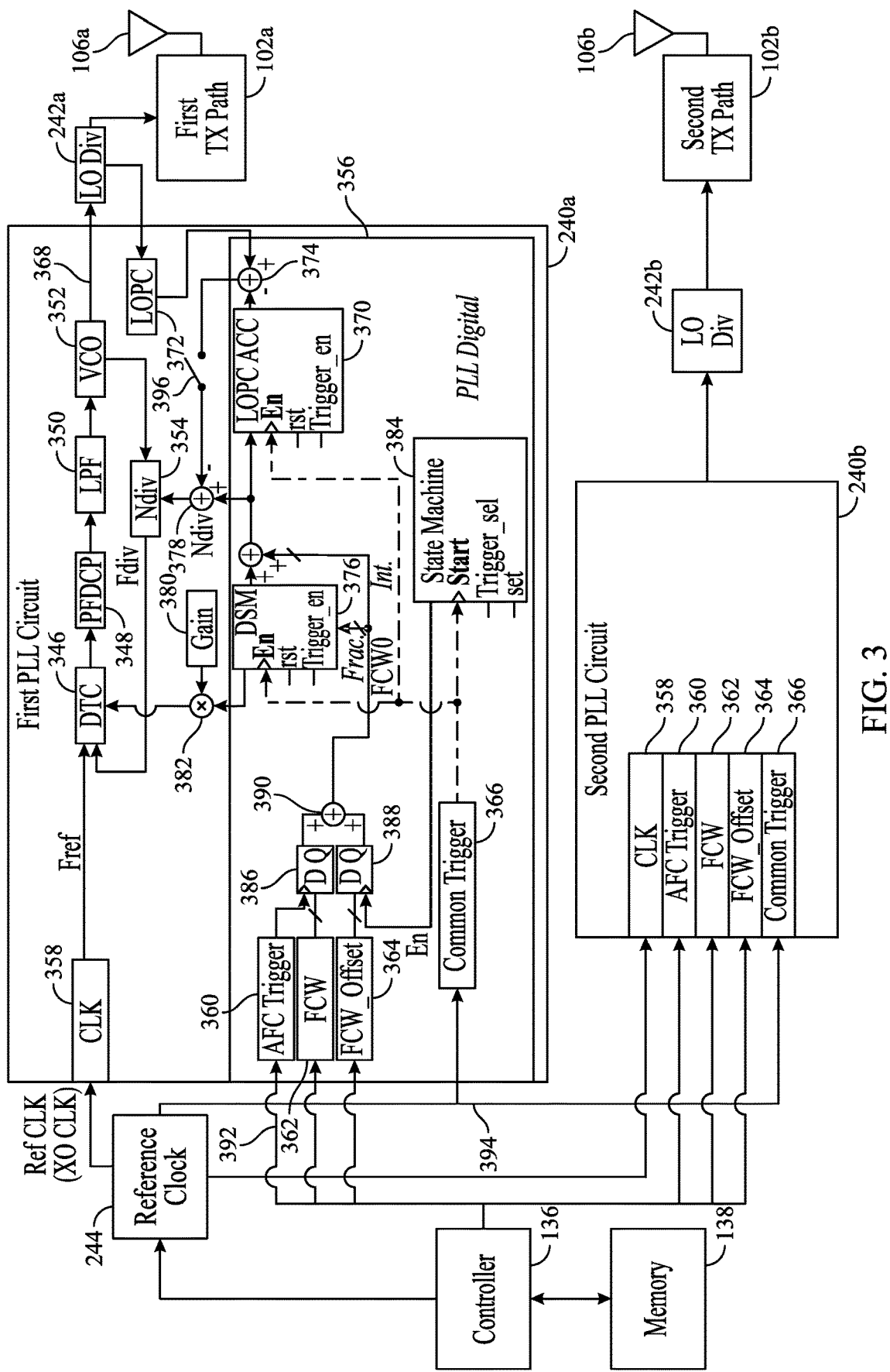
FIG. 3 is a block diagram illustrating an example circuit for operating multiple phase-locked loop circuits.

The first PLL circuit 240a may include a fractional-N PLL with a delta sigma modulator (DSM), for example, as further described herein with respect to FIG. 3. The reference clock 244a may output a periodic signal at a particular reference frequency for the clock input of the first PLL circuit 240a. The first PLL circuit 240a may generate a periodic signal via a PLL-based DSM system. The post-divider 242a may divide the output frequency of the PLL circuit 240a by a particular integer, such as two, three, or four. It will be appreciated that the post-divider 242a is merely an example. In certain cases, a frequency multiplier may be coupled between the first PLL circuit 240a and the mixer 114a in addition to or instead of the post-divider 242a. The frequency multiplier may increase the frequency of the signal output by the first PLL circuit 240a. In some cases, the reference clocks 244a, 244b may be implemented via separate dividers coupled to the same reference clock as further described herein with respect to FIG. 4.

The controller 136 may be coupled to the first PLL circuit 240a and the second PLL circuit 240b. The controller 136 may trigger the first PLL circuit 240a and the second PLL circuit 240b to perform synchronizing action(s), such as initializing the PLL circuits 240a, 240b or initiating a frequency hopping sequence at the PLL circuits 240a, 240b. For example, the controller 136 may output a common trigger to initialize the PLL circuits 240a, 240b. In response to receiving the common trigger, the PLL circuits 240a, 240b may start outputting periodic signals at a particular phase at the same time or within the allowable phase error (e.g., 1.5 ps to 270 ps of time delay depending on the output frequency).

FIG. 3 is a block diagram illustrating an example circuit 300 for operating multiple PLL circuits 240a, 240b. In this example, the first PLL circuit 240a may include a digital-to-time converter (DTC) 346, a phase frequency detector and charge pump (PFDCP) 348, a low-pass filter (LPF) 350, a voltage-controlled oscillator (VCO) 352, a frequency divider 354, and digital control logic 356. The first PLL circuit 240a may have input ports including a clock port (CLK) 358, an automatic frequency correction (AFC) trigger 360, a frequency codeword (FCW) 362, a frequency offset (FCW offset) 364, and a common trigger 366. The first PLL circuit 240a may be representative of the second PLL circuit 240b. In some aspects, FCW may refer to a "frequency command word" or a "frequency control word." The FCW may be representative of a frequency.

To keep an output signal 368 of the first PLL circuit 240a in phase with a reference clock signal (Fref) obtained from the CLK port 358, the output signal 368 is divided in the frequency divider 354 to form a divided clock signal (Fdiv) that is compared with the reference clock signal (Fref) in the phase frequency detector (PFD) of the PFDCP 348. The DTC 346 may apply a phase shift or time delay to the reference clock signal and/or the divided clock signal. Depending upon whether the divided clock signal is leading or lagging the reference clock signal, the PFD asserts either an up signal (Up) or a down signal (Dn). The charge pump of the PFDCP 348 charges an output signal (Icp) if the up signal is asserted or discharges the output signal if the down signal is asserted. The output signal of the charge pump is filtered by the low-pass filter 350 to produce a tuning voltage that sets the frequency of the VCO 352. The digital control logic 356 toggles or dithers the integer N used by frequency divider 354 to effect the desired integer plus some fraction relationship between the frequency of the reference clock signal and the frequency of the output signal 368.

To perform the incrementing or dithering of the integer N used by the frequency divider 354, the digital control logic 356 includes a phase accumulator or phase continuity circuitry 370. The fractional portion of the relationship between the frequency of the reference clock signal and the frequency of the output signal at the post-divider 242a may be represented by a ratio (K/M), where K and M are positive integers. This ratio may also be represented by the fraction F (e.g., K/M=F). The value of M may be used as the modulus for the counting in phase continuity circuitry 370 (e.g., mod(M)), which corresponds to the divider integer of the post-divider 242a, and that value of K as the increment is successively added to the phase accumulator count. The phase continuity circuitry 370 determines the expected phase of the post-divider 242a. The post-divider 242a may have an uncertain phase, which could differ from the expected phase, every time the post-divider 242a is powered ON (or activated from a low power state). A LO phase continuity circuit 372 may obtain the output signal of the post-divider 242a and output an indication of the phase of that output signal to an adder 374, which outputs the difference (D) between the phase accumulator and the post-divider phase. In some aspects, the frequency divider 354 may be configured to divide by N-D instead of N when the LO phase uncertainty is corrected (e.g., when the post-divider 242a is powered on). A switch 396 may be coupled between the adder 374 and the adder 378 to selectively apply the phase continuity correction, for example, for a certain duration in response to the post-divider 242a being power on. To reduce spurs in the output signal 368, the digital control logic 356 may also include a delta-sigma modulator (DSM) 376 that further dithers the incrementing of the divisor N of the frequency divider 354. Depending upon the phase of the post-divider 242a, phase continuity circuitry 370 adjusts the dithering of the feedback division at the frequency divider 354 by adding to the output of the DSM 376 in an adder 378. The frequency divider 354 adjusts its division responsive to a summed output signal from the adder 378. In some cases, the DSM 376 may adjust the phase shift or delay applied at the DTC 346 by multiplying the output of the DSM 376 with a gain 380 in a multiplier 382.

In certain aspects, the DSM 376 may obtain an indication of the carrier frequency for the transmission (e.g., the post-divider frequency). For example, the FCW 362 may represent a base frequency, and the frequency offset 364 may represent a frequency shift to the base frequency, such that the sum of the base frequency and the frequency shift is equal to the carrier frequency for the transmission. A first register 386 may store an indication of the base frequency, and a second register 388 may store an indication of the frequency shift. The DSM 376 may access the carrier frequency via the sum of the base frequency and the frequency shift from an adder 390.

The digital control logic 356 may also include a state machine 384 configured to perform fast frequency hopping operations. The state machine 384 may store a sequence of states indicative of when to perform a frequency hop, such that the start of state is representative of an occasion to initiate a frequency hop. Each of the states may be associated with a separate duration representative of how long to use the current frequency. The state machine 384 may control when a frequency update is accessed at the DSM 376. As an example, in response to a first state occurring, the state machine 384 may trigger the second register 388 to output the frequency shift (e.g., +300 MHz). In response to the updated frequency shift, the DSM 376 may adjust the value of N of the frequency divider 354. After a particular duration (e.g., two slots) in response to a second state occurring, the state machine 384 may trigger the second register 388 to output an updated frequency shift (e.g., +500 MHz). The value of the frequency shift at each of the states may be updated by the controller 136 via the frequency offset 364.

In certain aspects, the controller 136 may trigger the first PLL circuit 240a and the second PLL circuit 240b (collectively referred to herein as "PLL circuits 240") to perform synchronized initialization. The operations to perform synchronized initialization may optionally begin where the PLL circuits 240 enable the DSM 376 and the phase continuity circuitry 370 to access the common trigger 366, for example, via the corresponding trigger enable (Trigger en) port. The PLL circuits 240 may reset the DSM 376 and the phase continuity circuitry 370 to start at a particular phase (e.g., zero degrees), for example, via the corresponding reset (rst) port. The controller 136 may trigger the reference clock 244 to send a signal to the common trigger 366 to start the DSM 376 and the phase continuity circuitry 370 at each of the PLL circuits 240 at the same time or within the allowable phase error. For example, the reference clock 244 may be coupled to the common trigger 366, such that the common trigger signal is timed with the reference clock to allow for low latency in triggering the synchronized initialization. In response to receiving the common trigger (for example, via the corresponding enable (En) port), the DSM 376 and the phase continuity circuitry 370 at each of the PLL circuits 240 may initiate the frequency divider 354 at the same time or within the allowable phase error. In certain cases, the signal on the common trigger 366 may be accessed in time with the reference clock, for example, via a register (not shown) coupled between the reference clock and the common trigger 366. In certain aspects, the controller 136 may be coupled to the common trigger 366 with the reference clock 244 as long as the PLL circuits 240 have the same delay or within allowable phase error.

For certain aspects, the controller 136 may trigger the PLL circuits 240 to perform synchronized fast frequency hopping. For example, the operations to perform synchronized fast frequency hopping may optionally begin where the PLL circuits 240 set the state machine 384 to a particular state, for example, via the state selection port (set). In some cases, the particular state may be an initial state in a sequence of states or any state in the sequence associated with frequency hops. The PLL circuits 240 may obtain an updated value for the frequency offset 364 and store the value at the second register 388. The PLL circuits 240 may enable the state machine 384 to access the common trigger 366, for example, via the corresponding trigger enable (Trigger sel) port. The controller 136 may output a signal to the common trigger 366 to start the state machine 384 at the PLL circuits 240 at the same time or within the allowable phase error. In response to receiving the common trigger (for example, via the corresponding start port), the state machine 384 at each of the PLL circuits 240 may initiate the frequency hopping operations. For example, the state machine 384 may trigger the second register 388 to output the frequency shift for the first frequency hop in a sequence of frequency hops.

In certain aspects, the controller 136 may trigger the PLL circuits 240 to perform synchronized automatic frequency correction. In certain cases, the output frequency of the PLL circuits 240 may deviate from a target or nominal frequency (e.g., 2,000 MHz), for example, due to temperature drift of the reference clock 244 (or a crystal oscillator used as a clock source for the reference clock) and/or frequency variations related to the age of the reference clock 244 (or crystal oscillator). As the operating temperature of the reference clock 244 (or crystal oscillator) changes over time, the output frequency of the PLL circuits 240 may drift from the target or nominal frequency. As an example, at an operating temperature higher than an ambient room temperature, the output frequency of the PLL circuits 240 may fall below a target frequency (e.g., 2,000 MHz).

Frequency corrections may be performed at the PLL circuits 240 to compensate for the frequency drift over time. The operations to perform synchronized frequency correction may optionally begin where the PLL circuits 240 obtain an updated value for the base frequency, for example, via the FCW 362, which is stored in the first register 386. The PLL circuits 240 may obtain an indication to perform a frequency correction, for example, via the AFC trigger 360. The AFC trigger 360 may trigger the first register 386 to output the updated value for the base frequency, and the DSM 376 may apply the updated frequency to adjust the frequency divider 354 in response to obtaining the updated frequency.

In certain cases, the AFC trigger 360 may be coupled to a first bus 392 in communication with the controller 136, and the common trigger 366 may be coupled to a second bus 394 in communication with the controller 136. The first bus 392 may be a digital bus. The second bus 394 may have a reduced latency compared to the first bus 392 to reduce any delay between the PLL circuits 240 from synchronizing in response to the common trigger signal. The relative delay in the AFC trigger between the PLL circuits 240 may be relaxed due to the small frequency changes performed for AFC, and thus, a digital bus (e.g., the first bus 392) can be used for AFC synchronization.

In certain aspects, the reference clocks associated with the PLL circuits may be synchronized. Referring to FIG. 3, the controller 136 may trigger the reference clock 244 to synchronize the signals output to the CLK ports 358. For example, each PLL circuit may have a dedicated divider after a common clock source (e.g., an oscillator). The reference clock for each of the PLL circuits may be implemented as separate dividers for each of the PLL circuits coupled to the output of the common clock source. The phase variation of the dividers may cause a phase delta between the reference clocks of the PLL circuits. For example, the phase delta may be as large as the period of the common clock source multiplied by the integer factor of the divider (e.g., N T=N·400 ps assuming the clock source has a frequency of 2,500 MHz). To synchronize the reference clocks, the dividers may be reset at the same time or within the allowable phase error.

Figure 4:
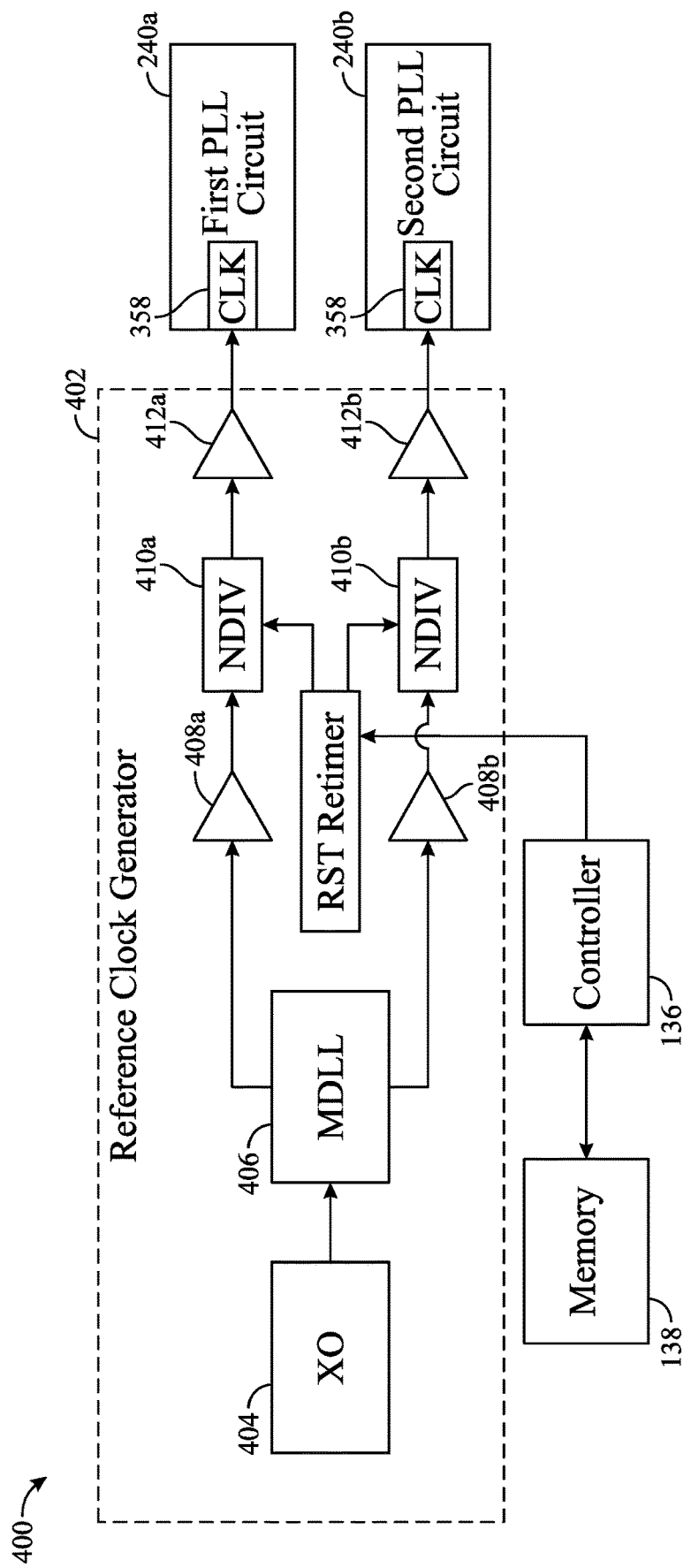
FIG. 4 is a block diagram illustrating an example circuit for synchronizing frequency dividers in a reference clock generator.

FIG. 4 is a block diagram illustrating an example circuit 400 for synchronizing dividers in a reference clock generator 402. In this example, the reference clock generator 402 includes separate reference clock paths for the PLL circuits 240 to allow for synchronized and/or asynchronous operation of the PLL circuits 240. The separate reference clock paths also allow for different reference clock frequencies to be output for the PLL circuits 240 using the same oscillator. The reference clock generator 402 may be representative of the reference clock(s) 244 depicted in FIGS. 2 and 3.

The reference clock generator 402 may include a crystal oscillator (XO) 404, a multiplying delay-locked loop (MDLL) 406, and frequency dividers 410a, 410b. In certain cases, first buffers 408a, 408b may be arranged between the MDLL 406 and the frequency dividers 410a, 410b, and second buffers 412a, 412b may be arranged between the frequency dividers 410a, 410b and the PLL circuits 240b. The crystal oscillator 404 may output a periodic signal to the MDLL 406, which may maintain a constant phase of the periodic signal. The MDLL 406 may output the periodic signal to each of the frequency dividers 410a, 410b, which divide the frequency of the periodic signal by a specific factor. The frequency dividers 410a, 410b output the divided signal to the CLK ports 358 of the PLL circuits 240. The controller 136 may trigger a reset retimer 414 to synchronize the dividers 410a, 410b to output at the same phase or within the allowable phase error.

Figure 5:
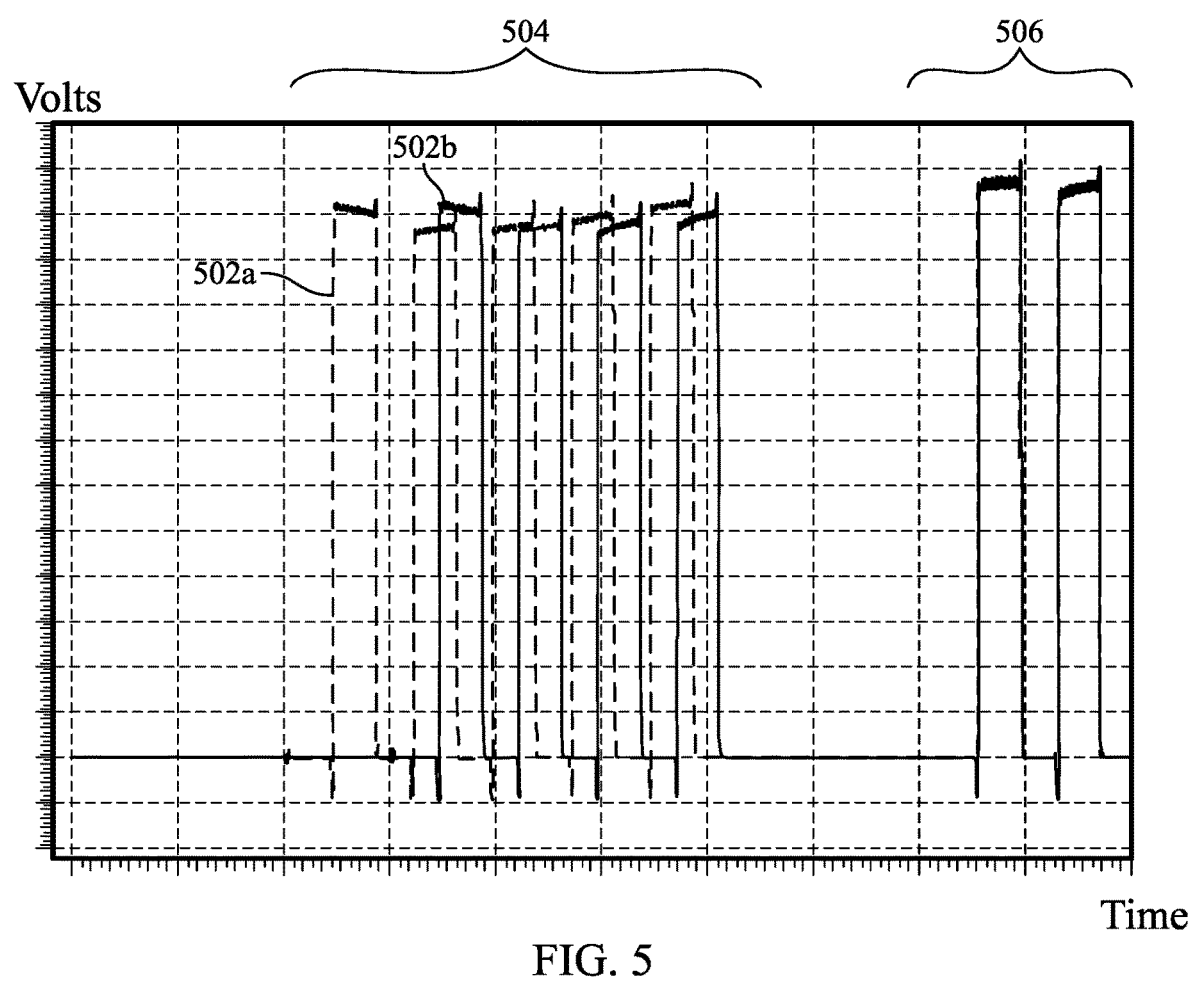
FIG. 5 is a graph illustrating the synchronization of reference clock signals for phase-locked loop circuits.

FIG. 5 is a graph illustrating the synchronization of reference clock signals for PLL circuits. In this example, the reference clock signals 502a, 502b may be unsynchronized during a first time window 504, such that there may be a significant phase difference between the reference clock signals 502a, 502b. In response to a trigger to synchronize the dividers, the reference clock signals 502a, 502b may be synchronized during a second time window 506, where the reference clock signals 502a, 502b may have the same phase or within the allowable phase error.

Figure 6:
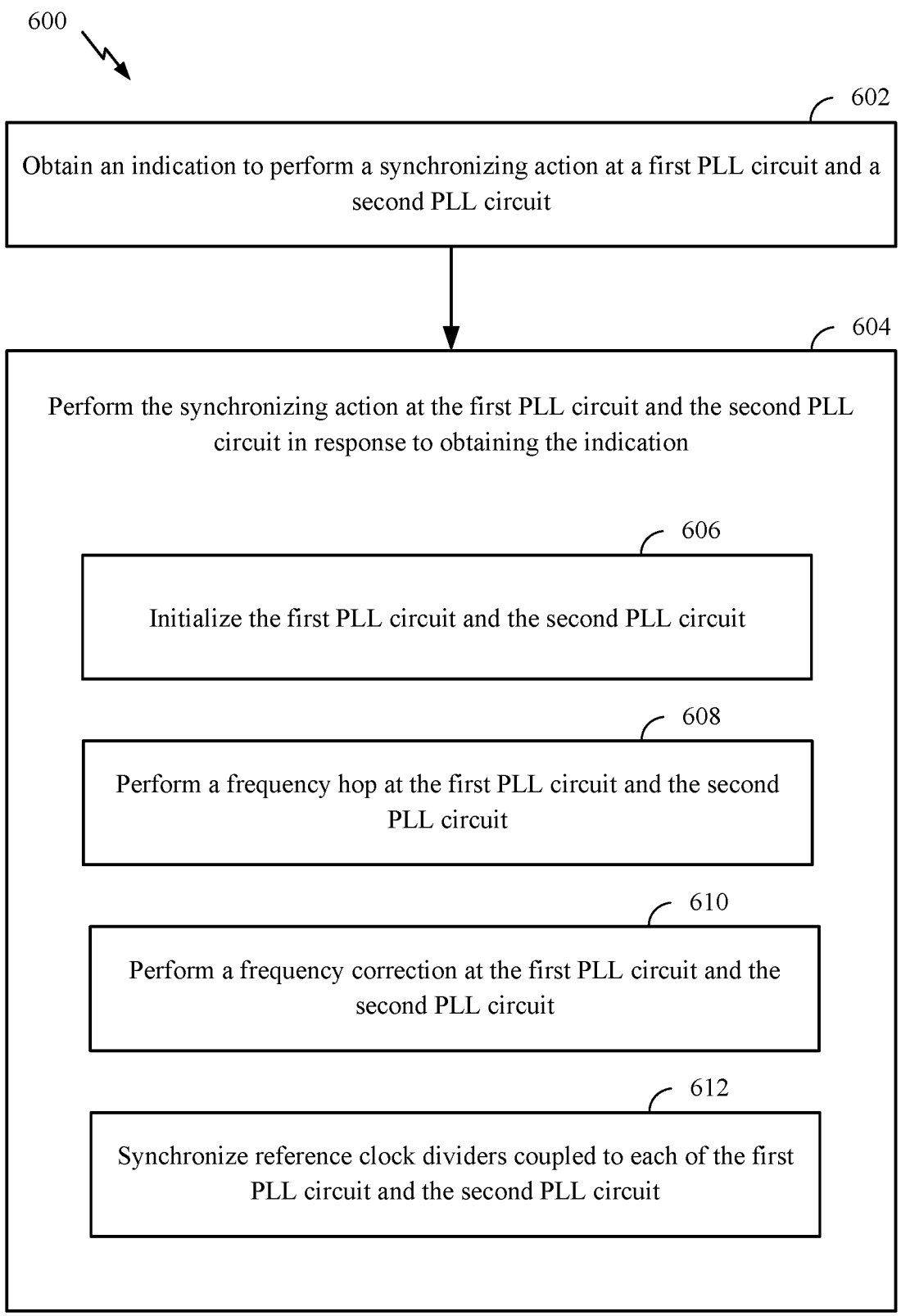
FIG. 6 is a flow diagram of example operations for synchronizing phase-locked loop circuits.

FIG. 6 is a flow diagram of example operations 600 for synchronizing PLL circuits. The operations 600 may be performed by a transceiver, such as the RF transceiver circuit 200. The operations 600 may be implemented as software components (e.g., computer-executable code or instructions) that are executed and run on one or more processors (e.g., the controller 136 of FIG. 1). Further, the transmission and/or reception of signals by the transceiver in operations 600 may be enabled, for example, by one or more antennas (e.g., the antenna 106 of FIG. 1). In certain aspects, the transmission and/or reception of signals by the transceiver may be implemented via a bus interface of a circuit (e.g., an RFIC) obtaining and/or outputting signals.

The operations 600 may optionally begin at block 602, where the transceiver circuit may obtain an indication to perform a synchronizing action at a first PLL circuit (e.g., the first PLL circuit 240a) and a second PLL circuit (e.g., the second PLL circuit 240b). The transceiver circuit may obtain the indication at the first PLL circuit and the second PLL circuit. In certain aspects, a processor (e.g., the controller 136) may output, to the first PLL circuit and the second PLL circuit, a signal (e.g., the common trigger and/or AFC trigger) to trigger the synchronizing action, for example, as described herein with respect to FIGS. 3 and 4. The synchronizing action may include performing a synchronized initialization of the first PLL circuit and the second PLL circuit, for example, as described herein with respect to FIG. 3.

At block 604, the transceiver circuit may perform the synchronizing action at the first PLL circuit and the second PLL circuit in response to obtaining the indication. For example, performing the synchronizing action comprises at least one of initializing the first PLL circuit and the second PLL circuit at block 606; performing a frequency hop at the first PLL circuit and the second PLL circuit at block 608; performing a frequency correction at the first PLL circuit and the second PLL circuit at block 610; or synchronizing reference clock dividers coupled to each of the first PLL circuit and the second PLL circuit at block 612, for example, as described herein with respect to FIGS. 3 and 4.

In certain aspects, the PLL circuits may perform the synchronizing action at the same time or within the maximum allowable phase error. For example, the transceiver circuit may start to perform the synchronizing action at the first PLL circuit in a time instance (e.g., where $t_1$ represents the time instance for the first PLL circuit), and the transceiver circuit may start to perform the synchronizing action at the second PLL circuit in a time window ($\Delta t$) relative to the time instance (e.g., $t_2 = t_1 \pm \Delta t$, where $t_2$ represents the time instance for the second PLL circuit, and $\Delta t$ corresponds to the maximum allowable phase error).

In certain aspects, the synchronizing action may include initializing the first PLL circuit and the second PLL circuit, for example, as described herein with respect to FIG. 3. The transceiver circuit may enable, at each of the first PLL circuit and the second PLL circuit, a DSM (e.g., the DSM 376) and phase continuity circuitry (e.g., the phase continuity circuitry 370) to receive a common trigger (e.g., the common trigger 366). The indication to perform the synchronizing action may include the common trigger. The transceiver circuit may reset, at each of the first PLL circuit and the second PLL circuit, the DSM and the phase continuity circuitry. To perform the synchronizing action, the transceiver circuit may initialize the first PLL circuit and the second PLL circuit in response to obtaining the common trigger. To initialize the first PLL circuit and the second PLL circuit, the transceiver circuit may output a periodic signal from each of the first PLL circuit and the second PLL circuit, the periodic signals having a same phase or a phase within a maximum allowable phase error (e.g., 40 degrees).

For certain aspects, the synchronizing action may include performing synchronized frequency hop(s) at the first PLL circuit and the second PLL circuit, for example, as described herein with respect to FIG. 3. As an example, the transceiver circuit may set, at each of the first PLL circuit and the second PLL circuit, a state machine (e.g., the state machine 384) to a particular state (e.g., an initial state or any state in a sequence of states). The particular state may be associated with a frequency hop in a sequence of frequency hops. Each of the states may be associated with a different frequency hop in the sequence of frequency hops. The transceiver circuit may obtain, at each of the first PLL circuit and the second PLL circuit, an indication to switch from outputting a first frequency to a second frequency. The transceiver circuit may enable, at each of the first PLL circuit and the second PLL circuit, the state machine to receive a common trigger (e.g., the common trigger 366). As an example, the transceiver circuit may enable the state machines to receive the common trigger via a common trigger enable port (e.g., Trigger sel). The indication to perform the synchronizing action may include the common trigger. To perform the synchronizing action, the transceiver circuit may perform a frequency hop at the first PLL circuit and the second PLL circuit in response to obtaining the common trigger. To perform the frequency hop, the transceiver circuit may switch, at each of the first PLL circuit and the second PLL circuit, from outputting a periodic signal at the first frequency to outputting the periodic signal at the second frequency at the same time or within the allowable phase error.

The indication to switch from outputting the first frequency to the second frequency may include an updated value for the frequency offset. As an example, the first PLL circuit and the second PLL circuit may obtain an updated value for a frequency offset (e.g., the frequency offset 364). To obtain the indication to switch from outputting the first frequency to the second frequency, the transceiver circuit may read (e.g., access) a register (e.g., the second register 388) storing the frequency offset. In some cases, the second frequency may be offset from the first frequency by the frequency offset stored in the register, for example, when the frequency offset is zero before the updated value.

In certain aspects, the synchronizing action may include performing a synchronized frequency correction at the first PLL circuit and the second PLL circuit, for example, as described herein with respect to FIG. 3. The frequency correction may be performed in response to frequency drift occurring at the PLL circuits, for example, due to temperature drift or components aging. As an example, the transceiver circuit may obtain, at each of the first PLL circuit and the second PLL circuit, an indication to update a base frequency (e.g., the FCW 362). To perform the synchronizing action, the transceiver circuit may output, from each of the first PLL circuit and the second PLL circuit, a periodic signal at a frequency based on the updated base frequency in response to obtaining a frequency correction trigger (e.g., the AFC trigger 360), where the indication to perform the synchronizing action may include the frequency correction trigger. The frequency may be equal to the sum of the updated base frequency and a frequency offset (e.g., the frequency offset 364) as described herein with respect to FIG. 3. To obtain the indication to update the base frequency, the transceiver circuit may read (e.g., access) a register (e.g., the first register 386) storing a frequency codeword representative of the base frequency. To obtain the indication to perform the synchronizing action, the transceiver circuit may obtain, at each of the first PLL circuit and the second PLL circuit, the frequency correction trigger via a digital bus (e.g., the first bus 392).

In certain aspects, the synchronizing action may include synchronizing the reference clocks coupled to the PLL circuits, for example, as described herein with respect to FIG. 4. For example, the transceiver circuit may reset a reference clock generator (e.g., the reference clock 244) coupled to each of the first PLL circuit and the second PLL circuit. The reference clock generator may be reset before or in response to obtaining the indication to perform the synchronizing action. To reset the reference clock generator, the transceiver circuit may reset, for each of the first PLL circuit and the second PLL circuit, a frequency divider (e.g., the dividers 410a, 410b) coupled to the reference clock generator. To reset the frequency divider, the transceiver circuit may trigger the frequency divider, for each of the first PLL circuit and the second PLL circuit, to start outputting a periodic signal at a particular frequency that is a fraction of a frequency of an input signal (e.g., the output signal from the MDLL 406).

For certain aspects, the synchronization of the PLL circuits may be performed to enable coherent transmission of signals via different antenna ports, such as coherent UL MIMO communications. For example, the transceiver circuit may output a first signal via a first transmit path (e.g., the first transmit path 102a) having the first PLL circuit, and the transceiver circuit may output a second signal via a second transmit path (e.g., the second transmit path 102b) having the second PLL circuit, such that the first signal is coherent with the second signal. The first signal may considered to be coherent with the second signal if certain criteria for coherent UL MIMO are satisfied, such as the allowable difference between the measured relative power and the allowable phase error.

Example Wireless Communications Network

Figure 7:
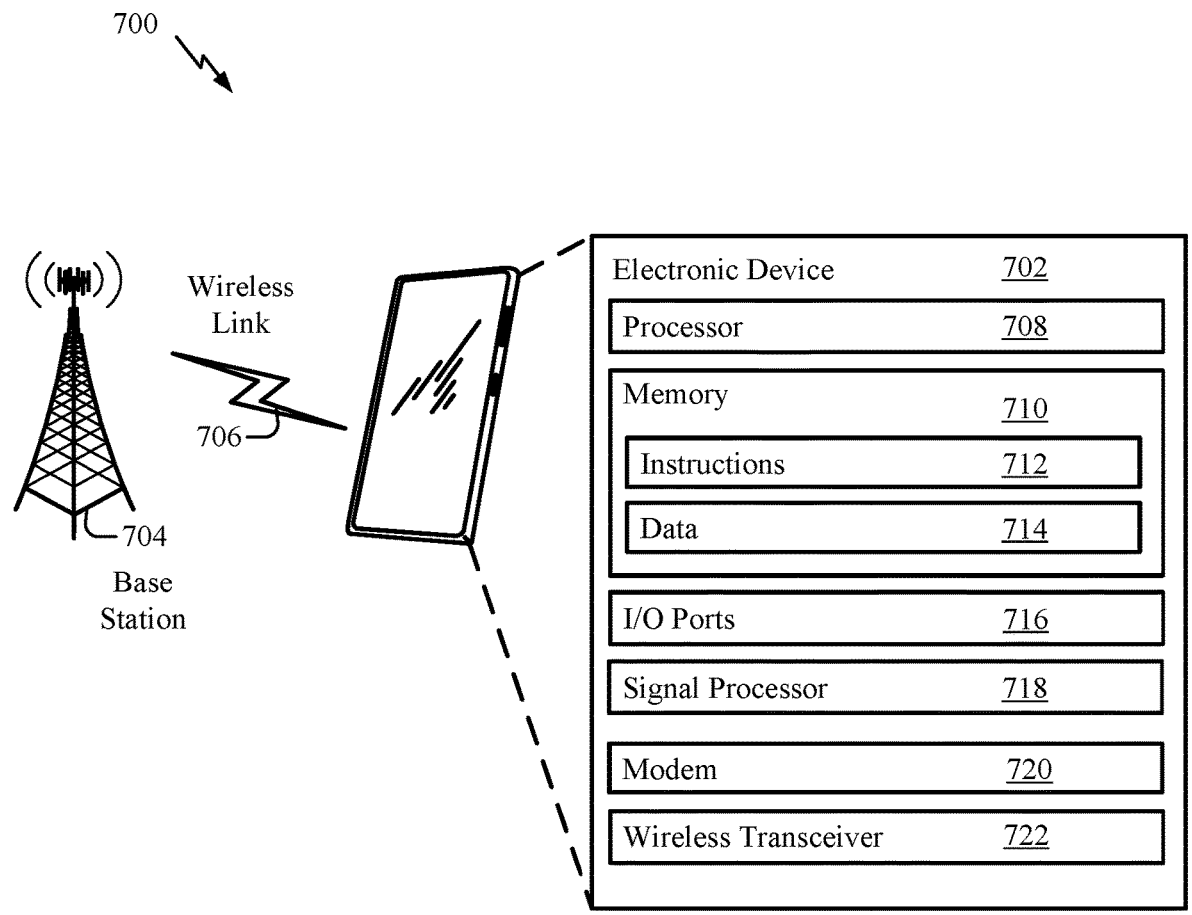
FIG. 7 is a diagram of a wireless communication network that includes a wireless communication device configured to synchronize phase-locked loop circuits, for example, for coherent transmissions.

In certain aspects, the apparatus and methods for synchronizing PLL circuits may be used in certain wireless communication devices in a wireless network. FIG. 7 is a diagram of a wireless communication network 700 that includes a wireless communication device 702, which has a wireless transceiver 722 such as the RF transceiver circuit 100 of FIG. 1. In certain aspects, the wireless transceiver 722 may be configured to synchronize PLL circuits, for example, as described herein with respect to FIGS. 2-6.

In the wireless communication network 700, the wireless communication device 702 communicates with a base station 704 through a wireless link 706. As shown, the wireless communication device 702 is depicted as a smartphone. However, the wireless communication device 702 may be implemented as any suitable computing or other electronic device, such as a cellular base station, broadband router, access point, cellular or mobile phone, gaming device, navigation device, media device, laptop computer, desktop computer, tablet computer, server computer, network-attached storage (NAS) device, smart appliance, vehicle-based communication system, Internet of Things (IoT) device, sensor or security device, asset tracker, and so forth.

The base station 704 communicates with the wireless communication device 702 via the wireless link 706, which may be implemented as any suitable type of wireless link. Although depicted as a base station tower of a cellular radio network, the base station 704 may represent or be implemented as another device, such as a satellite, terrestrial broadcast tower, access point, peer-to-peer device, mesh network node, fiber optic line, another electronic device generally as described above, and so forth. Hence, the wireless communication device 702 may communicate with the base station 704 or another device via a wired connection, a wireless connection, or a combination thereof. The wireless link 706 can include a downlink of data or control information communicated from the base station 704 to the wireless communication device 702 and an uplink of other data or control information communicated from the wireless communication device 702 to the base station 704. The wireless link 706 may be implemented using any suitable communication protocol or standard, such as 3rd Generation Partnership Project Long-Term Evolution (3GPP LTE), 3GPP New Radio Fifth Generation (NR 5G), IEEE 802.11 (WiFi), IEEE 802.16 (WiMAX), Bluetooth™, and so forth.

The wireless communication device 702 includes a processor 708 and a memory 710. The memory 710 may be or form a portion of a computer-readable storage medium. The processor 708 may include any type of processor, such as an application processor or a multi-core processor, that is configured to execute processor-executable instructions (e.g., code) stored by the memory 710. The memory 710 is configured to store instructions (e.g., computer-executable code or instructions) that when executed by the processor 708, cause the processor 708 to perform the operations for synchronizing PLL circuits such as the operations 600 described with respect to FIG. 6, or any aspect related to such operations. The memory 710 may include any suitable type of data storage media, such as volatile memory (e.g., random access memory (RAM)), non-volatile memory (e.g., flash memory), optical media, magnetic media (e.g., disk or tape), and so forth. In the context of this disclosure, the memory 710 is implemented to store instructions 712, data 714, and other information of the wireless communication device 702, and thus when configured as or part of a computer-readable storage medium, the memory 710 does not include transitory propagating signals or carrier waves. The memory 710 may include non-transitory computer-readable media (e.g., tangible media).

The wireless communication device 702 may also include input/output ports 716. The I/O ports 716 enable data exchanges or interaction with other devices, networks, or users or between components of the device.

The wireless communication device 702 may further include a signal processor (SP) 718 (e.g., such as a digital signal processor (DSP)). The signal processor 718 may function similar to the processor 708 and may be capable of executing instructions and/or processing information in conjunction with the memory 710.

For communication purposes, the wireless communication device 702 also includes a modem 720, a wireless transceiver 722, and an antenna (not shown). The wireless transceiver 722 provides connectivity to respective networks and other wireless communication devices connected therewith using radio-frequency (RF) wireless signals. The wireless transceiver 722 may include the circuitry for synchronizing PLL circuits described herein with respect to FIGS. 1-4, such as the RF transceiver (circuit) 100, 200 of FIG. 1 and/or FIG. 2. The wireless transceiver 722 may facilitate communication over any suitable type of wireless network, such as a wireless local area network (WLAN), a peer-to-peer (P2P) network, a mesh network, a cellular network, a wireless wide area network (WWAN), a navigational network (e.g., the global positioning system (GPS) of North America or another global navigation satellite system (GNSS)), and/or a wireless personal area network (WPAN).

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for obtaining, means for performing, means for initializing, means for enabling, means for resetting, and/or means for setting may include a transceiver (e.g., the RF transceiver circuit 200), PLL circuits (e.g., the PLL circuits 240), and/or a processor (e.g., the controller 136).

Based on the present disclosure, it should be appreciated that the apparatus and the method for operating PLL circuits described herein provide various advantages. For example, the methods and apparatus described herein may allow for a UE to perform coherent UL MIMO communications, which may provide improved wireless communication performance. Coherent UL MIMO may allow a UE to transmit a stronger signal to other wireless communication devices (e.g., a base station). For example, coherent UL MIMO may allow a UE to transmit at improved data rates and/or reduced latencies due to the improved signal quality at the receiver. Coherent UL MIMO may allow a UE to increase its communication distance, such as, communicating at the edge of a cell due to the stronger signal strength at the receiver. The methods and apparatus described herein may allow a UE to dynamically switch between coherent UL MIMO and non-coherent MIMO, for example, for UL carrier aggregation and/or single port communications.

Example Aspects

In addition to the various aspects described above, specific combinations of aspects are within the scope of the disclosure, some of which are detailed below:

Aspect 1: A method of operating phase-locked loop (PLL) circuits, comprising: obtaining an indication to perform a synchronizing action at a first PLL circuit and a second PLL circuit; and performing the synchronizing action at the first PLL circuit and the second PLL circuit in response to obtaining the indication.

Aspect 2: The method of Aspect 1, wherein performing the synchronizing action comprises: starting to perform the synchronizing action at the first PLL circuit in a time instance; and starting to perform the synchronizing action at the second PLL circuit in a time window relative to the time instance.

Aspect 3: The method of Aspect 1 or 2, wherein performing the synchronizing action comprises at least one of: initializing the first PLL circuit and the second PLL circuit; performing a frequency hop at the first PLL circuit and the second PLL circuit; performing a frequency correction at the first PLL circuit and the second PLL circuit; or synchronizing reference clock dividers coupled to each of the first PLL circuit and the second PLL circuit.

Aspect 4: The method according to any of Aspects 1-3, further comprising: enabling, at each of the first PLL circuit and the second PLL circuit, a delta sigma modulator (DSM) and phase continuity circuitry to receive a common trigger, wherein the indication to perform the synchronizing action includes the common trigger; and resetting, at each of the first PLL circuit and the second PLL circuit, the DSM and the phase continuity circuitry, wherein performing the synchronizing action comprises initializing the first PLL circuit and the second PLL circuit in response to obtaining the common trigger.

Aspect 5: The method of Aspect 4, wherein initializing the first PLL circuit and the second PLL circuit comprises outputting a periodic signal from each of the first PLL circuit and the second PLL circuit, the periodic signals having a same phase.

Aspect 6: The method according to any of Aspects 1-5, further comprising: setting, at each of the first PLL circuit and the second PLL circuit, a state machine to a particular state; obtaining, at each of the first PLL circuit and the second PLL circuit, an indication to switch from outputting a first frequency to a second frequency; and enabling, at each of the first PLL circuit and the second PLL circuit, the state machine to receive a common trigger, wherein the indication to perform the synchronizing action includes the common trigger and wherein performing the synchronizing action comprises performing a frequency hop at the first PLL circuit and the second PLL circuit in response to obtaining the common trigger.

Aspect 7: The method of Aspect 6, wherein: obtaining the indication to switch from outputting the first frequency to the second frequency comprises reading a register storing a frequency offset; the second frequency is offset from the first frequency by the frequency offset; and performing the frequency hop comprises switching, at each of the first PLL circuit and the second PLL circuit, from outputting a periodic signal at the first frequency to outputting the periodic signal at the second frequency.

Aspect 8: The method of Aspect 6 or 7, wherein the particular state is associated with the frequency hop in a sequence of frequency hops.

Aspect 9: The method according to any of Aspects 1-8, further comprising obtaining, at each of the first PLL circuit and the second PLL circuit, an indication to update a base frequency, wherein: the indication to perform the synchronizing action includes a frequency correction trigger; and performing the synchronizing action comprises outputting, from each of the first PLL circuit and the second PLL circuit, a periodic signal at a frequency based on the updated base frequency in response to obtaining the frequency correction trigger.

Aspect 10: The method of Aspect 9, wherein: obtaining the indication to update the base frequency comprises reading a register storing a frequency codeword representative of the base frequency; and obtaining the indication to perform the synchronizing action comprises obtaining, at each of the first PLL circuit and the second PLL circuit, the frequency correction trigger via a digital bus.

Aspect 11: The method according to any of Aspects 1-10, further comprising resetting a reference clock generator coupled to each of the first PLL circuit and the second PLL circuit.

Aspect 12: The method of Aspect 11, wherein the reference clock generator is reset before or in response to obtaining the indication to perform the synchronizing action.

Aspect 13: The method of Aspect 11 or 12, wherein resetting the reference clock generator comprises resetting, for each of the first PLL circuit and the second PLL circuit, a frequency divider coupled to the reference clock generator.

Aspect 14: The method of Aspect 13, wherein resetting the frequency divider comprises triggering the frequency divider, for each of the first PLL circuit and the second PLL circuit, to start outputting a periodic signal at a particular frequency that is a fraction of a frequency of an input signal.

Aspect 15: The method according to any of Aspects 1-14, further comprising: outputting a first signal via a first transmit path having the first PLL circuit; and outputting a second signal via a second transmit path having the second PLL circuit, such that the first signal is coherent with the second signal.

Aspect 16: An apparatus comprising: a first PLL circuit; and a second PLL circuit, wherein the first PLL circuit and the second PLL circuit are configured to: obtain an indication to perform a synchronizing action, and perform the synchronizing action in response to obtaining the indication.

Aspect 17: The apparatus of Aspect 16, wherein to perform the synchronizing action, the first PLL circuit and the second PLL circuit are further configured to: start to perform the synchronizing action at the first PLL circuit in a time instance; and start to perform the synchronizing action at the second PLL circuit in a time window relative to the time instance.

Aspect 18: The apparatus of Aspect 16 or 17, wherein to perform the synchronizing action, the first PLL circuit and the second PLL circuit are further configured to: initialize the first PLL circuit and the second PLL circuit; perform a frequency hop at the first PLL circuit and the second PLL circuit; perform a frequency correction at the first PLL circuit and the second PLL circuit; synchronize reference clock dividers coupled to each of the first PLL circuit and the second PLL circuit; or perform a combination thereof.

Aspect 19: The apparatus according to any of Aspects 16-18, wherein the first PLL circuit and the second PLL circuit are further configured to: enable, at each of the first PLL circuit and the second PLL circuit, a delta sigma modulator (DSM) and phase continuity circuitry to receive a common trigger, wherein the indication to perform the synchronizing action includes the common trigger; and reset, at each of the first PLL circuit and the second PLL circuit, the DSM and the phase continuity circuitry, wherein to performing the synchronizing action, the first PLL circuit and the second PLL circuit are further configured to initialize the first PLL circuit and the second PLL circuit in response to obtaining the common trigger.

Aspect 20: The apparatus of Aspect 19, wherein to initialize the first PLL circuit and the second PLL circuit, the first PLL circuit and the second PLL circuit are further configured to output a periodic signal from each of the first PLL circuit and the second PLL circuit, the periodic signals having a same phase.

Aspect 21: The apparatus according to any of Aspects 16-20, wherein the first PLL circuit and the second PLL circuit are further configured to: set, at each of the first PLL circuit and the second PLL circuit, a state machine to a particular state; obtain, at each of the first PLL circuit and the second PLL circuit, an indication to switch from outputting a first frequency to a second frequency; and enable, at each of the first PLL circuit and the second PLL circuit, the state machine to receive a common trigger, wherein the indication to perform the synchronizing action includes the common trigger and wherein to perform the synchronizing action, the first PLL circuit and the second PLL circuit are further configured to perform a frequency hop at the first PLL circuit and the second PLL circuit in response to obtaining the common trigger.

Aspect 22: The apparatus of Aspect 21, wherein: to obtain the indication to switch from outputting the first frequency to the second frequency, the first PLL circuit and the second PLL circuit are further configured to read a register configured to store a frequency offset; the second frequency is offset from the first frequency by the frequency offset; and to perform the frequency hop, the first PLL circuit and the second PLL circuit are further configured to switch, at each of the first PLL circuit and the second PLL circuit, from outputting a periodic signal at the first frequency to outputting the periodic signal at the second frequency.

Aspect 23: The apparatus of Aspect 21 or 22, wherein the particular state is associated with the frequency hop in a sequence of frequency hops.

Aspect 24: The apparatus according to any of Aspects 16-23, wherein: the first PLL circuit and the second PLL circuit are further configured to obtain, at each of the first PLL circuit and the second PLL circuit, an indication to update a base frequency, wherein: the indication to perform the synchronizing action includes a frequency correction trigger; and to perform the synchronizing action, the first PLL circuit and the second PLL circuit are further configured to output, from each of the first PLL circuit and the second PLL circuit, a periodic signal at a frequency based on the updated base frequency in response to obtaining the frequency correction trigger.

Aspect 25: The apparatus of Aspect 24, wherein: to obtain the indication to update the base frequency, the first PLL circuit and the second PLL circuit are further configured to read a register configured to store a frequency codeword representative of the base frequency; and to obtain the indication to perform the synchronizing action, the first PLL circuit and the second PLL circuit are further configured to obtain, at each of the first PLL circuit and the second PLL circuit, the frequency correction trigger via a digital bus.

Aspect 26: The apparatus according to any of Aspects 16-25, further comprising: a reference clock generator coupled to each of the first PLL circuit and the second PLL circuit; a memory; and a processor coupled to the memory, wherein the processor is further configured to reset the reference clock generator.

Aspect 27: The apparatus of Aspect 26, wherein the processor is further configured to reset the before or in response to the indication to perform the synchronizing action.

Aspect 28: The apparatus of Aspect 26 or 27, wherein to reset the reference clock generator, the processor is further configured to reset, for each of the first PLL circuit and the second PLL circuit, a frequency divider coupled to the reference clock generator.

Aspect 29: The apparatus of Aspect 28, wherein to reset the frequency divider, the processor is further configured to trigger the frequency divider, for each of the first PLL circuit and the second PLL circuit, to start outputting a periodic signal at a particular frequency that is a fraction of a frequency of an input signal.

Aspect 30: The apparatus according to any of Aspects 16-29, further comprising: a first transmit path having the first PLL circuit; and a second transmit path having the second PLL circuit, wherein the first transmit path is configured to output a first signal using the first PLL circuit, and wherein the second transmit path is configured to output a second signal using the second PLL circuit, such that the first signal is coherent with the second signal.

Aspect 31: An apparatus, comprising: a memory comprising computer-executable instructions; and a processor configured to execute the computer-executable instructions and cause the apparatus to perform a method in accordance with any of Aspects 1-15.

Aspect 32: An apparatus, comprising means for performing a method in accordance with any of Aspects 1-15.

Aspect 33: A non-transitory computer-readable medium comprising computer-executable instructions that, when executed by a processor of a processing system, cause the processing system to perform a method in accordance with any of Aspects 1-15.

Aspect 34: A computer program product embodied on a computer-readable storage medium comprising code for performing a method in accordance with any of Aspects 1-15.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a signal may refer to a detectable physical quantity or impulse (such as a voltage, current, or magnetic field strength over time) by which messages or information can be transmitted. A signal may carry information available for observation.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of operating phase-locked loop (PLL) circuits, comprising:
   obtaining an indication to perform a synchronizing action at a first PLL circuit and a second PLL circuit;
   performing the synchronizing action at the first PLL circuit and the second PLL circuit in response to obtaining the indication by at least one of performing a frequency hop at the first PLL circuit and the second PLL circuit or performing a frequency correction at the first PLL circuit and the second PLL circuit;
   outputting a first signal via a first transmit path having the first PLL circuit; and
   outputting a second signal via a second transmit path having the second PLL circuit, such that the first signal is coherent with the second signal.

2. The method of claim 1, wherein performing the synchronizing action comprises:
   starting to perform the synchronizing action at the first PLL circuit in a time instance; and
   starting to perform the synchronizing action at the second PLL circuit in a time window relative to the time instance.

3. The method of claim 1, wherein performing the synchronizing action further comprises at least one of:
   initializing the first PLL circuit and the second PLL circuit;
   or
   synchronizing reference clock dividers coupled to each of the first PLL circuit and the second PLL circuit.

4. A method of operating phase-locked loop (PLL) circuits, comprising:
   obtaining an indication to perform a synchronizing action at a first PLL circuit and a second PLL circuit;
   performing the synchronizing action at the first PLL circuit and the second PLL circuit in response to obtaining the indication;
   enabling, at each of the first PLL circuit and the second PLL circuit, a delta sigma modulator (DSM) and phase continuity circuitry to receive a common trigger, wherein the indication to perform the synchronizing action includes the common trigger; and
   resetting, at each of the first PLL circuit and the second PLL circuit, the DSM and the phase continuity circuitry, wherein performing the synchronizing action comprises initializing the first PLL circuit and the second PLL circuit in response to obtaining the common trigger.

5. The method of claim 4, wherein initializing the first PLL circuit and the second PLL circuit comprises outputting a periodic signal from each of the first PLL circuit and the second PLL circuit, the periodic signals having a same phase.

6. A method of operating phase-locked loop (PLL) circuits, comprising:
   obtaining an indication to perform a synchronizing action at a first PLL circuit and a second PLL circuit;
   performing the synchronizing action at the first PLL circuit and the second PLL circuit in response to obtaining the indication;
   setting, at each of the first PLL circuit and the second PLL circuit, a state machine to a particular state;
   obtaining, at each of the first PLL circuit and the second PLL circuit, an indication to switch from outputting a first frequency to a second frequency; and
   enabling, at each of the first PLL circuit and the second PLL circuit, the state machine to receive a common trigger, wherein the indication to perform the synchronizing action includes the common trigger and wherein performing the synchronizing action comprises performing a frequency hop at the first PLL circuit and the second PLL circuit in response to obtaining the common trigger.

7. The method of claim 6, wherein:
   obtaining the indication to switch from outputting the first frequency to the second frequency comprises reading a register storing a frequency offset;
   the second frequency is offset from the first frequency by the frequency offset; and performing the frequency hop comprises switching, at each of the first PLL circuit and the second PLL circuit, from outputting a periodic signal at the first frequency to outputting the periodic signal at the second frequency.

8. The method of claim 6, wherein the particular state is associated with the frequency hop in a sequence of frequency hops.

9. A method of operating phase-locked loop (PLL) circuits, comprising:
  obtaining an indication to perform a synchronizing action at a first PLL circuit and a second PLL circuit;
  performing the synchronizing action at the first PLL circuit and the second PLL circuit in response to obtaining the indication; and
  obtaining, at each of the first PLL circuit and the second PLL circuit, an indication to update a base frequency, wherein:
    the indication to perform the synchronizing action includes a frequency correction trigger; and
    performing the synchronizing action comprises outputting, from each of the first PLL circuit and the second PLL circuit, a periodic signal at a frequency based on the updated base frequency in response to obtaining the frequency correction trigger.

10. The method of claim 9, wherein:
  obtaining the indication to update the base frequency comprises reading a register storing a frequency codeword representative of the base frequency; and
  obtaining the indication to perform the synchronizing action comprises obtaining, at each of the first PLL circuit and the second PLL circuit, the frequency correction trigger via a digital bus.

11. A method of operating phase-locked loop (PLL) circuits, comprising:
  obtaining an indication to perform a synchronizing action at a first PLL circuit and a second PLL circuit;
  performing the synchronizing action at the first PLL circuit and the second PLL circuit in response to obtaining the indication; and
  resetting a reference clock generator coupled to each of the first PLL circuit and the second PLL circuit.

12. The method of claim 11, wherein the reference clock generator is reset before or in response to obtaining the indication to perform the synchronizing action.

13. The method of claim 11, wherein resetting the reference clock generator comprises resetting, for each of the first PLL circuit and the second PLL circuit, a frequency divider coupled to the reference clock generator.

14. The method of claim 13, wherein resetting the frequency divider comprises triggering the frequency divider, for each of the first PLL circuit and the second PLL circuit, to start outputting a periodic signal at a particular frequency that is a fraction of a frequency of an input signal.

15. An apparatus comprising:
  a first PLL circuit;
  a second PLL circuit,
  a first transmit path having the first PLL circuit, wherein the first transmit path is configured to output a first signal using the first PLL circuit; and
  a second transmit path having the second PLL circuit, wherein the second transmit path is configured to output a second signal using the second PLL circuit, such that the first signal is coherent with the second signal, and wherein the first PLL circuit and the second PLL circuit are configured to:
    obtain an indication to perform a synchronizing action, and
    perform the synchronizing action in response to obtaining the indication by at least one of performing a frequency hop at the first PLL circuit and the second PLL circuit or performing a frequency correction at the first PLL circuit and the second PLL circuit.

16. The apparatus of claim 15, wherein to perform the synchronizing action, the first PLL circuit and the second PLL circuit are further configured to:
  start to perform the synchronizing action at the first PLL circuit in a time instance; and
  start to perform the synchronizing action at the second PLL circuit in a time window relative to the time instance.

17. The apparatus of claim 15, wherein to perform the synchronizing action, the first PLL circuit and the second PLL circuit are further configured to:
  initialize the first PLL circuit and the second PLL circuit;
  synchronize reference clock dividers coupled to each of the first PLL circuit and the second PLL circuit; or
  perform a combination thereof.

18. An apparatus comprising:
  a first PLL circuit; and
  a second PLL circuit, wherein the first PLL circuit and the second PLL circuit are configured to:
    obtain an indication to perform a synchronizing action;
    perform the synchronizing action in response to obtaining the indication;
    enable, at each of the first PLL circuit and the second PLL circuit, a delta sigma modulator (DSM) and phase continuity circuitry to receive a common trigger, wherein the indication to perform the synchronizing action includes the common trigger; and
    reset, at each of the first PLL circuit and the second PLL circuit, the DSM and the phase continuity circuitry, wherein to perform the synchronizing action, the first PLL circuit and the second PLL circuit are further configured to initialize the first PLL circuit and the second PLL circuit in response to obtaining the common trigger.

19. The apparatus of claim 18, wherein to initialize the first PLL circuit and the second PLL circuit, the first PLL circuit and the second PLL circuit are further configured to output a periodic signal from each of the first PLL circuit and the second PLL circuit, the periodic signals having a same phase.

20. An apparatus comprising:
  a first PLL circuit; and
  a second PLL circuit, wherein the first PLL circuit and the second PLL circuit are configured to:
    obtain an indication to perform a synchronizing action;
    perform the synchronizing action in response to obtaining the indication;
    set, at each of the first PLL circuit and the second PLL circuit, a state machine to a particular state;
    obtain, at each of the first PLL circuit and the second PLL circuit, an indication to switch from outputting a first frequency to a second frequency; and
    enable, at each of the first PLL circuit and the second PLL circuit, the state machine to receive a common trigger, wherein the indication to perform the synchronizing action includes the common trigger and wherein to perform the synchronizing action, the first PLL circuit and the second PLL circuit are further configured to perform a frequency hop at the first PLL circuit and the second PLL circuit in response to obtaining the common trigger.

21. The apparatus of claim 20, wherein:
to obtain the indication to switch from outputting the first frequency to the second frequency, the first PLL circuit and the second PLL circuit are further configured to read a register configured to store a frequency offset;
the second frequency is offset from the first frequency by the frequency offset; and
to perform the frequency hop, the first PLL circuit and the second PLL circuit are further configured to switch, at each of the first PLL circuit and the second PLL circuit, from outputting a periodic signal at the first frequency to outputting the periodic signal at the second frequency.

22. The apparatus of claim 20, wherein the particular state is associated with the frequency hop in a sequence of frequency hops.

23. An apparatus comprising:
a first PLL circuit; and
a second PLL circuit, wherein the first PLL circuit and the second PLL circuit are configured to:
obtain an indication to perform a synchronizing action;
perform the synchronizing action in response to obtaining the indication; and
obtain, at each of the first PLL circuit and the second PLL circuit, an indication to update a base frequency, wherein:
the indication to perform the synchronizing action includes a frequency correction trigger; and
to perform the synchronizing action, the first PLL circuit and the second PLL circuit are further configured to output, from each of the first PLL circuit and the second PLL circuit, a periodic signal at a frequency based on the updated base frequency in response to obtaining the frequency correction trigger.

24. The apparatus of claim 23, wherein:
to obtain the indication to update the base frequency, the first PLL circuit and the second PLL circuit are further configured to read a register configured to store a frequency codeword representative of the base frequency; and
to obtain the indication to perform the synchronizing action, the first PLL circuit and the second PLL circuit are further configured to obtain, at each of the first PLL circuit and the second PLL circuit, the frequency correction trigger via a digital bus.

25. An apparatus comprising:
a first PLL circuit;
a second PLL circuit, wherein the first PLL circuit and the second PLL circuit are configured to:
obtain an indication to perform a synchronizing action; and
perform the synchronizing action in response to obtaining the indication;
a reference clock generator coupled to each of the first PLL circuit and the second PLL circuit;
memory; and
one or more processors coupled to the memory, wherein the one or more processors are configured to reset the reference clock generator.

26. The apparatus of claim 25, wherein the one or more processors are configured to reset the reference clock generator before or in response to the indication to perform the synchronizing action.

27. The apparatus of claim 25, wherein to reset the reference clock generator, the one or more processors are configured to reset, for each of the first PLL circuit and the second PLL circuit, a frequency divider coupled to the reference clock generator.

28. The apparatus of claim 27, wherein to reset the frequency divider, the one or more processors are configured to trigger the frequency divider, for each of the first PLL circuit and the second PLL circuit, to start outputting a periodic signal at a particular frequency that is a fraction of a frequency of an input signal.

* * * * *